Ben-Ami Alexander,
INVENTOR.
BY
J. K. Haskell
ATTORNEY.

United States Patent Office 3,473,049
Patented Oct. 14, 1969

3,473,049
CURRENT SWITCHING CHARGING CONTROL CIRCUIT FOR A PULSE FORMING NETWORK
Ben-Ami Alexander, Chatsworth, Calif., assignor to Hughes Aircraft Company, Culver City, Calif., a corporation of Delaware
Filed June 22, 1966, Ser. No. 559,520
Int. Cl. H03k *17/00*
U.S. Cl. 307—252      4 Claims

ABSTRACT OF THE DISCLOSURE

The disclosed current switching charge control voltage regulator circuit includes a charging transformer coupled to a pulse forming network. The secondary winding of the charging transformer stores electrical energy not utilized in a particular charging cycle for the pulse forming network so that the energy may be transferred to the pulse forming network in the subsequent charging cycle. A plurality of silicon controlled rectifier switches regulate the discharge of energy, including the energy stored in the charging transformer, through the pulse forming network.

---

This invention relates to charge control voltage regulator circuits and more particularly to a highly efficient charge control voltage regulator circuit.

In the past, useful charge control voltage regulator circuits have been designed and constructed. However, the prior art circuits have operated at rather poor efficiency levels. The poor efficiency has existed because not all of the electrical energy supplied by the power source was transferred to a pulse forming network in a given cycle. The two basic approaches in handling the unused portion of energy was to either dissipate the energy by means of a hydrogen thyratron and dissipating resistor in parallel with a charging choke or to dissipate the energy in a dissipating resistor in the secondary of a charging transformer. In the former approach a shorter lifetime was experienced because of the utilization of a hydrogen thyratron. The latter method of dissipating the excess energy through the dissipating resistor in the secondary of the charging transformer is utilized in Stanford's 2-Mile Accelerator, EDN, April 1966, pp. 34–47.

It is, therefore, an object of this invention to provide an improved circuit which makes proper utilization of energy provided to the circuit.

It is a further object of this invention to provide an improved circuit which is more reliable and has a longer lifetime.

It is a still further object of this invention to provide an improved circuit which is more efficient.

Briefly, in accordance wtih the objects set forth above, the charge control voltage regulator circuit according to the present invention comprises a charging transformer capable of charging a pulse forming network to approximately twice the potential of an electrical power source. In addition to those elements, several switching means are incorporated to regulate the forming of the pulse, and the secondary of the charging transformer is designed to store the excess energy until the pulse is discharged into a load. Thereafter the unused portion of energy is transferred to the pulse forming network and then the charging cycle is repeated.

Additional objects, advantages, and characteristic features of the present invention will become readily apparent from the following detailed description of preferred embodiments of the invention when taken in conjunction with the accompanying drawings in which.

Figure 1:
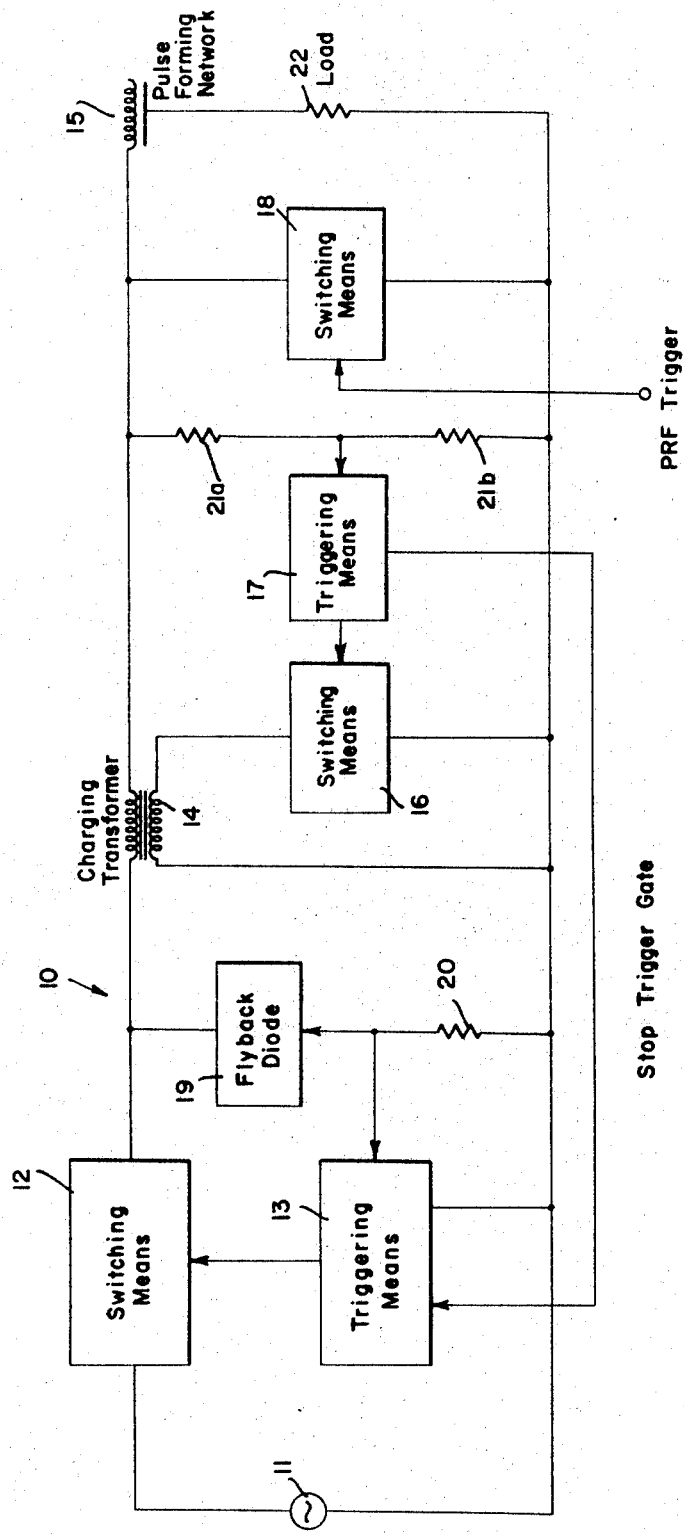
FIGURE 1 is a functional block diagram of a charge control voltage regulator circuit in accordance with the present invention.

Referring now to FIG. 1 there is shown a charge control voltage regulator circuit 10. In the operation of the charge control voltage regulator circuit 10, a switching means 12 is triggered on by a triggering means 13. A pulse forming network 15 charges to approximately twice the voltage of the electrical power supply 11 because of the resonance or ringing established by the inductance of a charging transformer 14 and the capacitance of the pulse forming network 15. When the desired voltage across the pulse forming network 15 is reached, the voltage across the pulse forming network 15 is higher than the potential of the power supply 11, thus the switching means 12 is reverse biased and further buildup of the pulse forming network 15 is prevented.

Meanwhile, when the buildup of the pulse forming network 15 is completed, a feedback arrangement which includes a switching means 16 and a triggering means 17 is activated. The switching means 16 is fired by the triggering means 17 which has been activated by comparing a reference voltage with the voltage applied across the resistor divider network 21a and 21b. The firing of the switching means 16 short circuits the secondary winding of the charging transformer 14. The energy in the primary winding of the charging transformer 14, i.e. the energy not utilized to charge the pulse forming network 15, is then transferred to the secondary winding and the energy circulates around the closed loop which includes the secondary winding and the switching means 16.

When the pulse recurring frequency trigger, hereinafter referred to as the PRF trigger, from a synchronizing unit, not shown, is applied to a switching means 18, the voltage across the pulse forming network 15 is discharged into a load 22, which may be a klystron pulse modulator. As a result of this discharge, a negative pulse will be transmitted to the secondary of the charging transformer 14 which will reverse bias the switching means 16. Thus, the energy circulating in the secondary of the charging transformer 14 will be transferred to the primary winding of the charging transformer 14. This energy will travel in a path which includes the primary winding, a sensing resistor 20, a flyback diode 19, the load 22 and the pulse forming network 15 until the energy is transferred to the pulse forming network 15.

Prior to the total transfer of energy circulating in secondary of the charging transformer 14 to the pulse forming network 15, the triggering means 13, which has been deactivated by a stop trigger signal, triggers the switching means 12 by comparing the voltage across a sensing resistor 20 with a reference voltage. Then the cycle is repeated as energy from the power supply 11 charges the pulse forming network 15.

Figure 2:
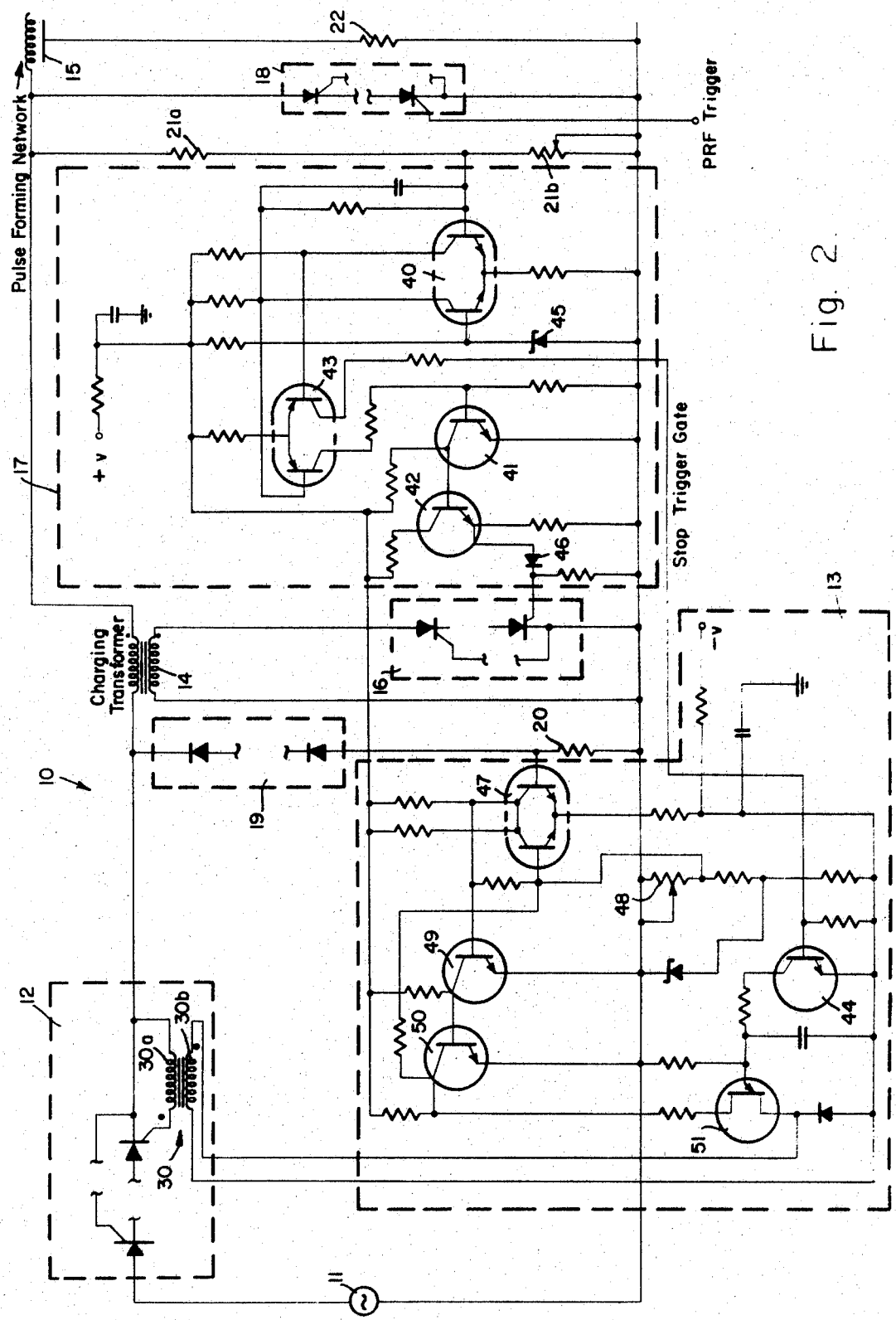
FIG. 2 is a detailed schematic of the functional block diagram of FIG. 1.

Referring now to FIG. 2, there is shown a detailed schematic of the functional block diagam of FIG. 1. The switching means 12 controls and rectifies the electrical energy supplied to the charge control voltage regulator circuit 10. The switching means 12 may be comprised of a plurality of conventional silicon controlled rectifiers, such as, the type 150RE manufactured by International Rectifier. The number of silicon controlled rectifiers to be included in the switching means 12 depends upon the energy potential of the power supply 11. Individual silicon controlled rectifiers may be arranged to be fired by slave-triggering from the secondaries 30a of a pulse transformer 30. The pulse transformer 30 may be comprised of separate secondaries 30a and one common primary 30b. The secondaries of the pulse transformer 30 may be mounted on the individual modules of the switching means 12 and the pulse transformer may be insulated for approximately twice the voltage of the power supply 11.

The pulse forming network 15 and the charging transformer 14 are conventional elements. As stated earlier, the charging of the pulse forming network 15 is obtained as a result of a resonance or ringing established by the inductance of the charging transformer 14 and the capacitance of the pulse forming network 15. The values of the respective elements may be changed depending upon the charging rate of the pulse forming network 15. Further explanation of a pulse forming network 15 and the charging transformer 14 will appear later in the application during the discussion of the various waveforms exhibited by the charge control voltage regulator circuit 10.

When the voltage across the pulse forming network 15 is at its desired value, which is approximately twice that of the potential of the power supply 11, the voltage across the resistor 21b will be higher than the voltage level of the voltage regulator 45. Thus, the right-hand side of the transistor 40 will be forward biased and it will conduct. The transistor 40 and its associated elements represent a Schmitt trigger circuit; therefore, when the right-hand side of the transistor is conducting the left-hand side of the transistor will not conduct. When the right-hand side of the transistor 40 is conducting, a negative pulse from the collector of that side will travel to the base of a transistor 43. The transistor 43, which is a conventional p-n-p type, will be forward biased and it will conduct. Since the right-hand side of the transistor 43 is conducting, a stop trigger gate will be applied to the base of a transistor 44. This gate will forward bias the transistor 44 and it will conduct. When the transistor 44 conducts, a relaxation oscillator including a transistor 51, which may be a unijunction transistor, will not oscillate. Thus, a trigger gate will no longer be available to fire the silicon controlled rectifiers of the switching means 12. It should be noted that the switching means 12 could not be activated at this time because it is reverse biased by the voltage across the pulse forming network 15. However, when the pulse forming voltage is discharged into the load 22, the switching means 12 will no longer be reverse biased and it is then capable of being fired.

When the right-hand side of the transistor 43 is conducting, the left-hand side will be reverse biased and the voltage across the resistors in the collector portion of that side of the transistor will decrease, thus applying a negative pulse to the base of a transistor 41, which along with a transistor 42 may be an n-p-n type 2N697. This pulse will reverse bias the transistor 41 and prevent conduction, thus, the potential at the collector of the transistor 41 will increase. Since the base of the transistor 42 is common to the collector of the transistor 41, the voltage there will increase and will forward bias the transistor 42 and it will conduct. Thus, there will be a positive pulse into a diode 46. Therefore, a gate will be supplied to trigger the switching means 16. The switching means 16 may comprise a plurality of conventional silicon controlled rectifiers, such as, the type 150RE manufactured by International Rectifier.

When the silicon controlled rectifiers of the switching means 16 are fired, the secondary of the charging transformer 14 is short circuited. Thus, the energy in the primary winding is transferred to the secondary winding and is stored in the magnetic field. It is this energy that will circulate around a closed loop and will be conserved so that it may be later transferred to the pulse forming network 15. This energy will circulate in the closed loop, which includes the switching means 16, except for an insignificant amount dissipated in the wires, until a PRF trigger from the synchronizing unit is applied to the third switching means 18.

When the PRF trigger fires the silicon controlled rectifiers in the switching means 18, which may be the type 150RE manufactured by International Rectifier, the voltage across the pulse forming network 15 is discharged into the load 22. The switching means 18 may also be comprised of a hydrogen thyratron. At this time the voltage across the resistor divider network 21a and 21b will go to approximately zero potential. When the potential across the resistor divider network 21a and 21b goes to zero the right hand side of transistor 40 will be reverse biased and it will cease conducting. The voltage potential at the collector of the right-hand side of the transistor 40 will rise, thus applying a positive pulse to the base of the right-hand side of the transistor 43. This pulse will reverse bias the right-hand side of the transistor 43 and it will cease conducting. When the right-hand side of the transistor 43 is not conducting, the positive pulse, or stop trigger gate, will no longer be applied to the base of the transistor 44. Thus, the transistor 44 will cease conducting and it can no longer prevent the transistor 51 from oscillating. However, a proper signal must be present at the base-two of the transistor 51 in order for the transistor 51 to oscillate so that the silicon controlled rectifiers of the switching means 12 may be fired.

When the right-hand side of the transistor 43 is not conducting the left-hand side of the transistor 43 will be forward biased and it will conduct. The conduction of the left-hand side of the transistor 43 will apply a positive pulse to the base of the transistor 41 which will forward bias the transistor 41 and it will conduct. With the conduction of the transistor 41, the base of the transistor 42, which is common to the collector of the transistor 41, will go more negative and will reverse bias the transistor 42 and it will cease conducting.

Since the transistor 42 is not conducting, a positive pulse will no longer be applied to the diode 46. Thus, the silicon controlled rectifiers of the switching means 16 will no longer be gated. Approximately a few microseconds after this time, a negative pulse will be transmitted to the secondary of the charging transformer 14 because of the discharging of the voltage across the pulse forming network 15 into the load 22. This negative pulse will reverse bias to the silicon controlled rectifiers of the switching means 16. The current in the secondary winding of transformer 14 will now flow through the sensing resistor 20, the flyback diode 19, the charging transformer 14, the pulse network 15, and the load 22. This energy will circulate in the aforementioned path until it charges up the pulse forming network 15 in accordance with the resonance or ringing established by the inductance of the charging transformer 14 and the capacitance of the pulse forming network 15.

During the time that the conserved energy is circulating in the aforementioned path, the potential across the sensing resistor 20 will go from a zero potential to a negative potential. This negative potential at the base of the transistor 47 will reverse bias the right-hand side of the transistor 47 and it will cease conducting. Thus, the base of the transistor 49, which is common to the collector of the right-hand side of the transistor 47, will go more positive. This action will forward bias the transistor 49 and it will start conducting. The base of the transistor 50, which is common to the collector of the transistor 49, will go more negative and this will reverse bias the transistor 50 and it will cease conducting. The voltage potential across the resistor in the base-two circuit of the transistor 51 will increase, thus further preventing the unijunction transistor 51 from oscillating.

As the energy that is stored in the magnetic field is transferred to the pulse forming network 15, the voltage across the sensing resistor 20 will go from a negative potential toward zero. When this potential is more positive than the potential across the reference resistor 48, the right-hand side of the transistor 47 will be forward biased and it will conduct. Thus, the base of the transistor 49, which is common to the collector of the right-hand side of the transistor 47, will go more negative and will reverse bias transistor 49 and it will cease conducting. The base of the transistor 50, which is common to the collector of the transistor 49, will go more positive and will forward bias the transistor 50 and it will conduct. When the transistor 50 conducts, the voltage across the resistor in the base-two circuit of the transistor 51 will decrease and the transistor 51 will oscillate, causing a pulse to be sent through the transformer 30 to fire the silicon controlled rectifiers of the first switching means 12. Therefore, the energy in the power supply will be able to travel through the charging transformer 14 to begin a new charging cycle.

Figure 3:
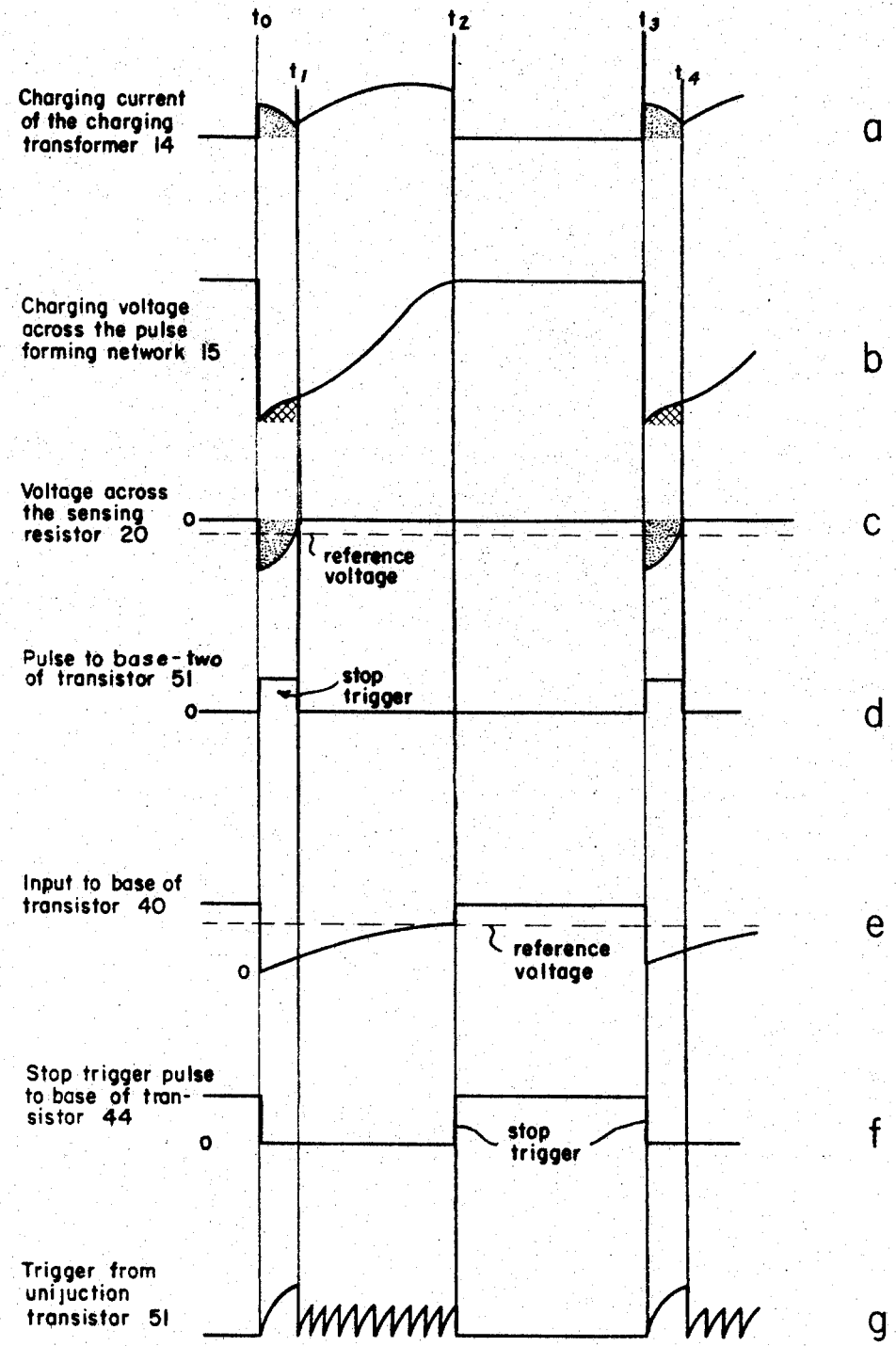
FIG. 3 illustrates several current and voltage waveforms of the charge control voltage regulator circuit in accordance with the present invention.

Referring now to FIG. 3, there are shown several current and voltage waveforms of the charge control voltage regulator circuit 10. The time $t_0$ represents the time when the third switching means 18 is fired by the PRF trigger. The time $t_0$ also represents a point in time after the circuit has been in operation for a few cycles. The waveform $e$ illustrates the input to the base of the right-hand side of the transistor 40. When this voltage drops below the reference voltage, the stop trigger pulse $f$ will no longer be applied to the base of the transistor 44. The transistor 44 will no longer conduct and the transistor 51 will attempt to oscillate, but will not oscillate until the proper signal is applied from the collector of the transistor 50.

At the time $t_1$, the voltage across the sensing resistor 20 will go more positive as it approaches a zero potential as illustrated by the voltage waveform $c$. Thus, the proper signal to the base-two of the transistor 51, as illustrated by the waveform $d$, is established and the transistor 51 begins to oscillate, as illustrated by the waveform $g$.

Referring back to the time $t_0$, the conserved energy stored in the magnetic field will be transferred to the primary winding of the charging transformer 14. This energy will then be transferred to the pulse forming network 15. The waveforms $a$ and $b$ illustrate the current in the charging transformer 14 and the voltage across the pulse forming network 15, respectively. Between the times $t_0$ and $t_1$ the current in the charging transformer 14 will decrease and the voltage across the pulse forming network 15 will increase as the conserved energy is transferred to the pulse forming network 15.

At the time $t_1$, the transistor 51 will oscillate and trigger the switching means 12. The electrical energy in the power supply 11 will be applied to the charge control voltage regulator circuit 10 and the current in the charging transformer 14 and the voltage across the pulse forming network 15 will increase as illustrated by the waveforms $a$ and $b$, respectively.

This charging action will continue until the voltage across the pulse forming network 15 is equal to approximately twice the voltage of the power supply 11 which occurs at the time $t_2$. At the time $t_2$ the voltage applied to the right-hand side of the transistor 40 will be higher than the reference voltage, as illustrated by the waveform $e$, thus the right-hand side of the transistor 40 will be forward biased and conduct. As stated earlier the switching means 12 will be reverse biased at this time and further buildup across the pulse forming network 15 will be discontinued. Additionally, at the time $t_2$, a stop trigger pulse as illustrated by the waveform $f$ will be applied to the base of the transistor 44. As stated earlier, when the transistor 44 is conducting, the transistor 51 will not oscillate; therefore, the switching means 12 is open and electrical energy from the power source 11 will not be allowed to travel to the charge control voltage regulator circuit 10. This condition will exist until the time $t_3$ when another PRF trigger fires the third switching means 18 and the cycle repeates itself.

The stippled area of the waveform $c$ between the time $t_0$ and $t_1$ represents the current of the conserved energy that is stored in the magnetic field. The stippled area of the waveform $a$ represents the current of the conserved energy that is transferred to the primary winding of the charging transformer 14 and then ultimately into the pulse forming network 15, as illustrated by the cross-hatched area of the voltage waveform $b$. It is the ultimate utilization of this conserved energy which makes possible a charge control voltage regulator circuit exhibiting a high efficiency rating.

Thus, although the present invention has been shown and described with reference to particular embodiments, nevertheless, various changes and modifications obvious to a person skilled in the art to which the invention pertains are deemed to lie within the spirit, scope, and contemplation of the invention as set forth in the appended claims.

What is claimed is:

1. A current switching charging control circuit for transferring electrical energy from an electrical power source to a load, comprising:
   a pulse forming network coupled to said load;
   a transformer having a primary winding and a secondary winding, a terminal of said primary winding being coupled to said pulse forming network;
   first switching means for controlling the electrical energy applied to said pulse forming network and being coupled between another terminal of said primary winding and a terminal of said electrical power source;
   second switching means coupled across said pulse forming network and said load for enabling electrical energy in said pulse forming network to discharge into said load;
   bistable switching means connected directly across said secondary winding for providing substantially zero impedance across said secondary winding when said bistable switching means is in one of its stable states and for providing a high impedance when said bistable switching means is in another of its stable states;
   a diode having one electrode coupled to said another terminal of said primary winding;
   a first resistor coupled between the other electrode of said diode and said load;
   first triggering means coupled to said pulse forming network, to said load and to said bistable switching means for applying a triggering signal to said bistable switching means to trigger said bistable switching means to one of its stable states in response to the voltage across said pulse forming network;
   second triggering means coupled to said first switching means, to said load, to said first triggering means and to said other electrode of said diode for triggering said first switching means to a high impedance state when said bistable switching means is in said one of its stable states and for triggering said first switching means to a state of substantially zero impedance in response to the voltage at said other electrode of said diode when said bistable switching means is in said other of its stable states.

2. A current switching charging control circuit according to claim 1 wherein said first, second and bistable switching means each include at least first and second silicon controlled rectifiers having their anode-cathode paths coupled in series, the control electrode of said first rectifier being connected to the anode-cathode path of said second rectifier, the control electrode of said second rectifier being adapted to receive a triggering signal.

3. A current switching charging control circuit according to claim 1 wherein said first triggering means includes a Schmitt trigger circuit, paired transistors having their emitters coupled together and their bases coupled to respective output terminals of said Schmitt trigger circuit, means for applying a signal at the collector of one of said paired transistors to said second triggering means, and second means for applying a signal at the collector of the other of said paired transistors to said bistable switching means.

4. A current switching charging control circuit according to claim 1 wherein said second triggering means comprises:

unijunction transistor relaxation oscillator means for applying an electrical signal to said first switching means, a first transistor switch coupled between said oscillator and said another electrode of said diode, and a second transistor switch coupled between said first triggering means and said oscillator.

References Cited
UNITED STATES PATENTS

| | | | |
|---|---|---|---|
| 3,119,968 | 1/1964 | Schonberg | 328—67 |
| 3,139,585 | 6/1964 | Ross et al. | 328—67 XR |
| 3,363,184 | 1/1968 | Smith | 328—67 XR |
| 3,383,623 | 5/1968 | Vercellotti et al. | 307—252 XR |

JOHN S. HEYMAN, Primary Examiner

STANLEY D. MILLER, Assistant Examiner

U.S. Cl. X.R.

307—246, 247, 260, 268, 297; 328—65, 67